United States Patent
Hachiya et al.

(10) Patent No.: US 9,118,580 B2
(45) Date of Patent: Aug. 25, 2015

(54) COMMUNICATION DEVICE AND METHOD FOR CONTROLLING TRANSMISSION PRIORITY RELATED TO SHARED BACKUP COMMUNICATION CHANNEL

(75) Inventors: Koji Hachiya, Fukuoka (JP); Tetsuo Ehara, Fukuoka (JP); Yasuyuki Mitsumori, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 685 days.

(21) Appl. No.: 13/165,898

(22) Filed: Jun. 22, 2011

(65) Prior Publication Data

US 2011/0317551 A1  Dec. 29, 2011

(30) Foreign Application Priority Data

Jun. 24, 2010 (JP) ................................. 2010-144181

(51) Int. Cl.
| | |
|---|---|
| *H04L 12/707* | (2013.01) |
| *H04L 12/703* | (2013.01) |
| *H04L 12/833* | (2013.01) |

(52) U.S. Cl.
CPC ................ *H04L 45/22* (2013.01); *H04L 45/28* (2013.01); *H04L 47/2458* (2013.01)

(58) Field of Classification Search
None
See application file for complete search history.

(56) References Cited

U.S. PATENT DOCUMENTS

| 2002/0141403 A1* | 10/2002 | Akahane et al. ............... 370/389 |
| 2006/0256712 A1 | 11/2006 | Imajuku et al. |
| 2010/0246401 A1* | 9/2010 | Woundy et al. ................ 370/236 |

FOREIGN PATENT DOCUMENTS

| JP | 1995-107091 | 4/1995 |
| JP | 2003-258851 | 9/2003 |
| JP | 2009-201156 | 9/2009 |

* cited by examiner

*Primary Examiner* — Jackie Zuniga Abad
(74) *Attorney, Agent, or Firm* — Fujitsu Patent Center

(57) ABSTRACT

A communication device includes a processor that is operative to perform actions, including, determining whether a failure occurs in a regular communication channel to transmit a packet to another communication device, selecting, upon determining that the failure occurs in the regular communication channel, a backup communication channel for transmitting the packet, determining, upon selecting the backup communication channel, whether the backup communication channel is shared by the regular communication channel and another regular communication channel, changing, upon determining that the backup communication channel is shared, a priority assigned to the packet transmitted from the regular communication channel to the backup communication channel, and controlling the transmission of the packet in accordance with the changed priority.

10 Claims, 16 Drawing Sheets

FIG. 5

| ADDRESS | | DATA |
|---|---|---|
| CLASS#0 | PCP#0 | CLASS |
| | PCP#1 | CLASS |
| | ⋮ | ⋮ |
| | PCP#7 | CLASS |
| CLASS#1 | PCP#0 | CLASS |
| | PCP#1 | CLASS |
| | ⋮ | ⋮ |
| | PCP#7 | CLASS |
| ⋮ | ⋮ | ⋮ |
| CLASS#Z | PCP#0 | CLASS |
| | PCP#1 | CLASS |
| | ⋮ | ⋮ |
| CLASS#Z | PCP#7 | CLASS |

117

COMMUNICATION DEVICE AND METHOD FOR CONTROLLING TRANSMISSION PRIORITY RELATED TO SHARED BACKUP COMMUNICATION CHANNEL

CROSS-REFERENCE TO RELATED APPLICATIONS

This application is based upon and claims the benefit of priority of the prior Japanese Patent Application No. 2010-144181, filed on Jun. 24, 2010, the entire contents of which are incorporated herein by reference.

FIELD

The disclosure herein relates to a communication device and a communication method.

BACKGROUND

In recent years, switching of communication channels for packets by using a path protection scheme has been known in communication devices such as packet transmission devices. In the path protection scheme, upon detection of a failure in a regular communication channel through which a communication device transmits packets in a normal state, the path is switched to a backup communication channel provided as a backup for the regular communication channel.

In the path protection scheme, there are cases in which the communication device sets the priorities for the packets and performs transmission control corresponding to the priorities of the packets. For example, the communication device buffers, in queues, the packets corresponding to the priorities of the packets and sequentially transmits the packets from the queue in which the packets with high priority are stored.

For a communications network with a 1:1 configuration in which backup communication channels are provided for the respective regular communication channels on a one-to-one basis, the line cost increases. Hence, recent communications networks employ, for example, an N:1 configuration in which one backup communication channel is provided for multiple regular communication channels. For example, Japanese Unexamined Patent Application Publication No. 2003-258851 discloses a bath protection technology.

SUMMARY

According to an aspect of the disclosed embodiments, a communication device includes a processor that is operative to perform actions, including, determining whether a failure occurs in a regular communication channel to transmit a packet to another communication device, selecting, upon determining that the failure occurs in the regular communication channel, a backup communication channel for transmitting the packet, determining, upon selecting the backup communication channel, whether the backup communication channel is shared by the regular communication channel and another regular communication channel, changing, upon determining that the backup communication channel is shared, a priority assigned to the packet transmitted from the regular communication channel to the backup communication channel, and controlling the transmission of the packet in accordance with the changed priority.

The object and advantages of the disclosed embodiments will be realized and attained by at least the features, elements, and combinations particularly pointed out in the claims.

It is to be understood that both the foregoing general description and the following detailed description are exemplary and explanatory and are not restrictive of the disclosed embodiments, as claimed.

BRIEF DESCRIPTION OF DRAWINGS

FIG. 5 illustrates the structure of a class-assignment table.

DESCRIPTION OF EMBODIMENTS

Embodiments of a communication device and a communication method disclosed herein will be described below in detail with reference to the accompanying drawings. It is to be noted that the embodiments are not intended to limit the technology disclosed herein. While a communication device is described below in conjunction with an example of a PE (provider edge) router, the communication device is not limited thereto.

In the related art, however, in the communications network with the N:1 configuration, when packets are transmitted from the regular communication channels to the backup communication channel, there is a possibility that the communication bands of the packets are not ensured.

That is, when the path protection scheme for the communications network with the 1:1 configuration is directly applied to an N:1-configuration communications network, ensuring the communication band may cause a problem described below.

For example, it is assumed that one backup communication channel is provided for regular communication channels for packets transmitted from the communication devices used by the users A and B. It is further assumed that, when the communication devices of the users A and B use the respective regular communication channels, the priorities of the packets are set to "high". In this case, for example, when the communication device of the user A uses the regular communication channel and the communication device of the user B uses the backup communication channel, the communication bands of the packets can be ensured even when the priorities of the packets transmitted from the communication devices of the users A and B are kept "high".

However, when both of the users A and B use the backup communication channel, there are cases in which the communication bands of the packets are not ensured depending on the communication capacity of the backup communication channel, since both of the priorities of the packets transmitted from the communication devices are "high".

Figure 1:
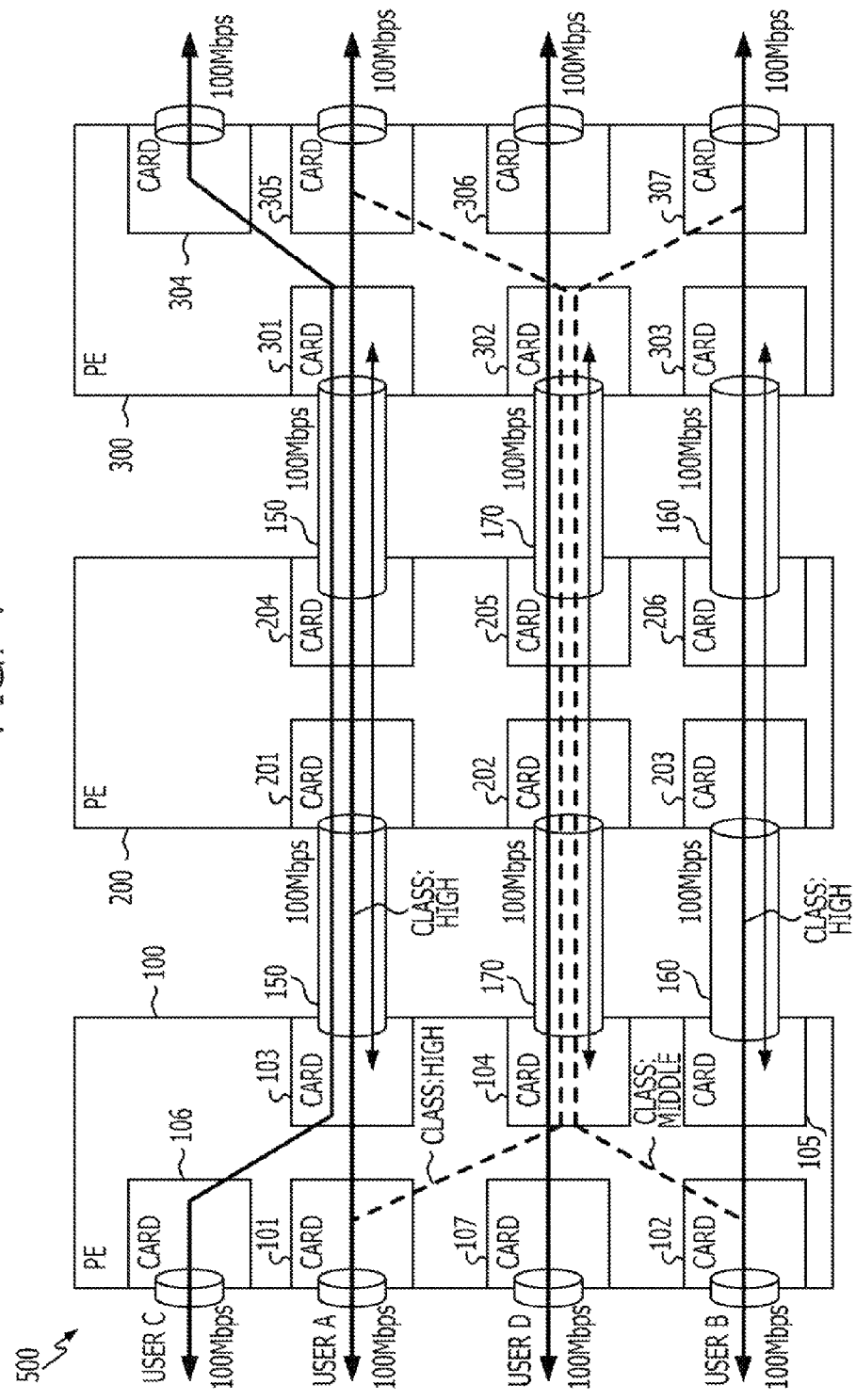
FIG. 1 illustrates an overall configuration of a communication system including communication devices according to an embodiment.

FIG. 1 illustrates an overall configuration of a communication system including PE routers according to an embodiment. FIG. 1 illustrates one example of path protection in a communications network with an N:1 configuration. As illustrated in FIG. 1, a communication system 500 includes PE routers 100, 200, and 300. The PE routers 100 and 200 are connected with each other through main paths 150 and 160 and a backup path 170, which serve as communication channels for transmission/reception of packets between the PE routers 100 and 200. The main paths 150 and 160 serve as regular communication channels used during transmission/reception of packets between the PE routers and the backup path 170 serves as a backup communication channel during failure of the main paths 150 and 160. Similarly, the PE routers 200 and 300 are connected with each other through the main paths 150 and 160 and the backup path 170. Although redundancy is provided between multiple links in each PE router in FIG. 1, redundancy may also be provided between links of multiple PE routers.

The PE router 100 includes network cards (hereinafter referred to as "cards") 101 to 107 for connection with a communications network. The PE router 200 includes cards 201 to 206. The PE router 300 includes cards 301 to 307. In the example in FIG. 1, it is assumed that packets sent from users A, B, C, and D are transmitted to the PE router 300 via the PE routers 100 and 200. In FIG. 1, it is also assumed that, when the user A transmits a packet through the main path 150 and a failure occurs in the main path 150, the packet is transmitted through the backup path 170. It is also assumed that the user A is provided with a service whose priority of packet transmission is high and thus whichever of the main path 150 and the backup path 170 is used by the user A, the packet priority (hereinafter referred to as a "class") therefor is set to "high". For example, a band of 100 Mbps (megabit per second) can be ensured for the user A. Dotted lines in FIG. 1 indicate flows of packets sent from the users A and B to the backup path 170.

In FIG. 1, it is also assumed that, when the user B transmits a packet through the main path 160 and a failure occurs in the main path 160, the packet is transmitted through the backup path 170. It is also assumed that the user B is provided with a service whose priority of packet transmission is approximate middle and, when the user B uses the main path 160, the class is set to "high" and a band of 100 Mbps can be ensured. When the user B uses the backup path 170 while the user A uses the main path 150, the class for the user B is set to "high" and a band of 100 Mbps can be ensured for the user B. On the other hand, when the user A uses the backup path 170, a class of "middle" is set for the user B, as illustrated in FIG. 1, and the user B is provided with a best-effort service. Details of assignment of classes to the users A and B are described below. It is also assumed that, in FIG. 1, the user C transmits a packet through the main path 150 and the user D transmits a packet through the backup path 170. It is also assumed that the users C and D are provided with services whose classes of the packet transmission are low. Since the users C and D share the paths with the users A and B whose classes are high, it is assumed the users A and B are provided with best-effort services. Thus, in the present embodiment, multiple users (flows) can be provided with different degrees of services.

Figure 2:
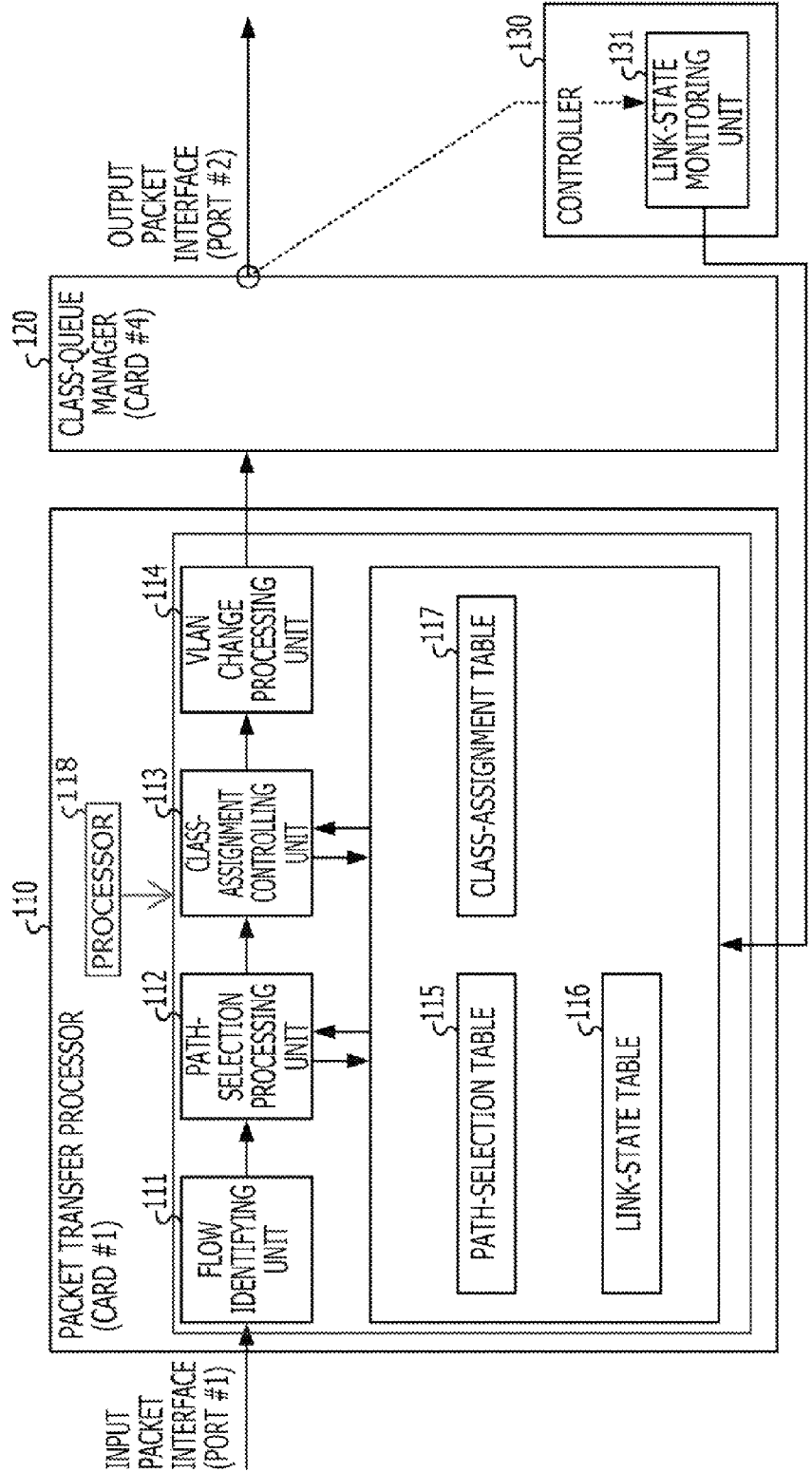
FIG. 2 is a block diagram of a PE router.

FIG. 2 is a block diagram of a PE router. While the configuration of the PE router 100 is illustrated in FIG. 2 by way of example, the PE routers 200 and 300 also have substantially the same configuration. The PE router 100 includes a packet transfer processor 110, a class-queue manager 120, and a controller 130. The packet transfer processor 110 is provided in, for example, the card 101. The packet transfer processor 110 includes a flow identifying unit 111, a path-selection processing unit 112, a class-assignment controlling unit 113, a VLAN (virtual local area network) change processing unit 114, a path-selection table 115, a link-state table 116, a class-assignment table 117, and a processor 118. The flow identifying unit 111, the path-selection processing unit 112, the class-assignment controlling unit 113, the VLAN (virtual local area network) change processing unit 114 may be software. The processor 118 may execute the flow identifying unit 111, the path-selection processing unit 112, the class-assignment controlling unit 113, and the VLAN (virtual local area network) change processing unit 114.

The flow identifying unit 111 identifies a flow of packets received from an input packet interface for the card 101. The path-selection processing unit 112 obtains a class-assignment table index of a packet on the basis of the path-selection table 115, the link-state table 116, and the class-assignment table 117, and determines an output packet interface. The path-selection processing unit 112 may be configured to transmit a path-monitoring packet to both of the main path 150 or 160 and the backup path 170 so as check a failure state of the paths. The path-monitoring packet is, for example, a packet for CC (continuity check) for service QAM (operation administration maintenance). When it is determined that a failure occurs in the main path 150 or 160, the path-selection processing unit 112 can select the backup path 170 for transmitting the packet.

The class-assignment controlling unit 113 obtains a packet class from the class-assignment table 117. More specifically, the class-assignment controlling unit 113 obtains a class by using, as an address, the class-assignment table index obtained by the path-selection processing unit 112 and a PCP (priority code point) bit of a customer VLAN tag of an input packet.

For example, when the path from the card 101 to the card 104 (e.g., the backup path 170) is selected, the VLAN change processing unit 114 changes a path identifier (VLAN ID) of an input packet or assigns a path identifier to an input packet. When the PE router 100 transmits a packet, received through the backup path 170, to the main path 150, the PE router 100 returns the changed path identifier of the input packet to its original path identifier or deletes the path identifier assigned to the input packet. For example, when the path from the card 101 to the card 103 (e.g., the main path 150) is selected or when the path identifier does not need to be changed even though the backup path 170 is selected, the processing for changing the path identifier is not performed. That is, the VLAN change processing unit 114 may be configured so as to determine whether or not the identifiers for the main paths 150 and 160 match each other and to change, when the identifiers match each other, identifiers added to packets to be transmitted from the main paths 150 and 160 to the backup path 170. Although a description in the present embodiment is given of an example in which the PCP bit of the customer VLAN tag is used as an address in the class-assignment table, a PCP bit of a service VLAN tag or the like may also be used. Similarly, a TOS (Type of Service) bit or DSCP (DiffServ Code Point) bit of IP (Internet Protocol) packets, an Exp bit of MPSL (Multi-Protocol Label Switching) packets, or the like may be used as an address in the class-assignment table.

The class-queue manager 120 is provided in, for example, the card 104. The class-queue manager 120 buffers packets in different queues, for example, a high class queue, a middle class queue, and a low class queue, in accordance with the packet class information obtained by the path-selection processing unit 112. Although the number of class types is three in the present embodiment, it may be larger than three. The class-queue manager 120 has SPQ (strict priority queuing). In the SPQ, packets are transferred to the output packet interface determined by the path-selection processing unit 112, in accordance with the priority defined by the order of the high class queue, the middle class queue, and the low class queue. The controller 130 has a link-state monitoring unit 131. The link-state monitoring unit 131 constantly monitors the state of a link for the output packet interface and reflects the obtained state in the link-state table 116.

Figure 3:
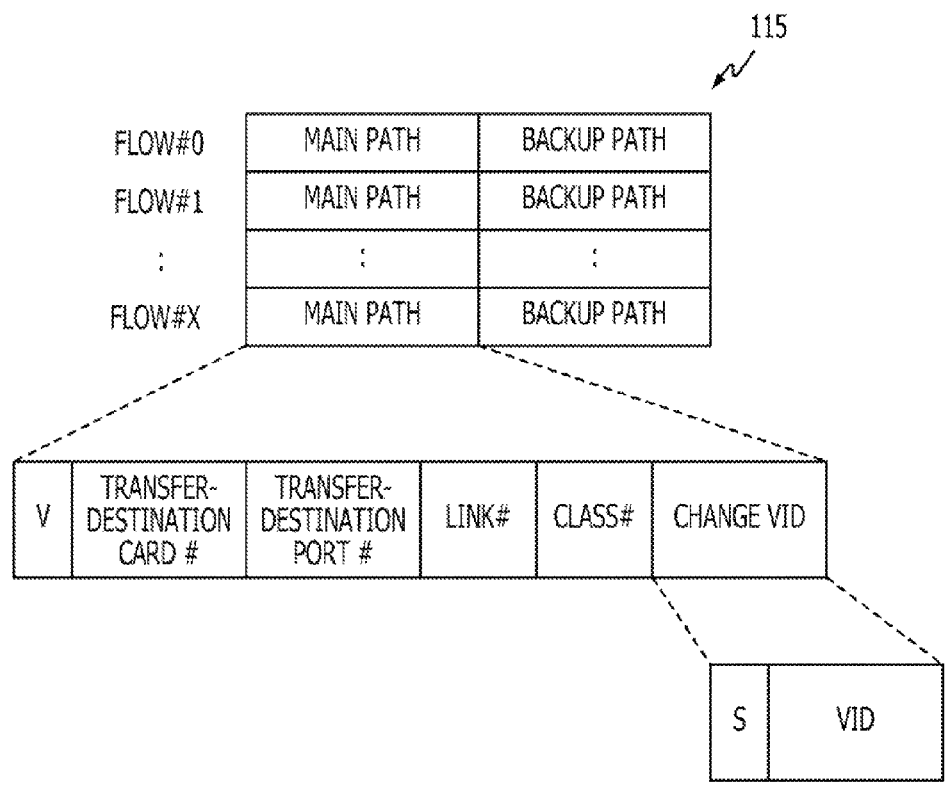
FIG. 3 illustrates the structure of a path-selection table.

The tables used by the packet transfer processor 110 will be described next. FIG. 3 illustrates the structure of the path-selection table 115. As illustrated in FIG. 3, the path-selection table 115 includes main-path information and backup-path information in association with multiple flow numbers (addresses). Each of the main-path information and the backup-path information includes a valid (V) bit, a transfer-destination card number, a transfer-destination port number, a link number, a class number, and a change VID (VLAN Identifier). For the valid bit, "0" indicates "invalid" and "1" indicates "valid". The change VID includes a select (S) bit and a VID. For the select bit, "0" indicates NOP (not operation), "1" indicates VID change, "2" indicates VID addition, and "3" indicates VID deletion. The VID includes a VID for change or a VID for addition. Unlike the related art, the path-selection table 115 in the present embodiment includes the class number and the change VID in addition to the valid bit, the transfer-destination card number, the transfer-destination port number, and the link number.

Figure 4:
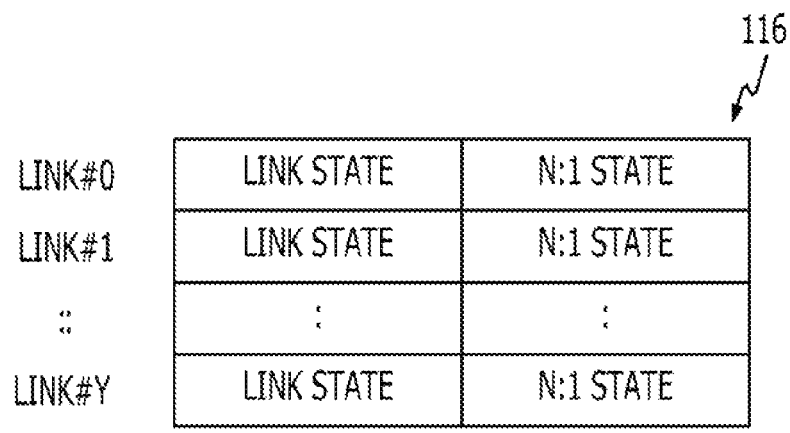
FIG. 4 illustrates the structure of a link-state table.

FIG. 4 illustrates the structure of the link-state table 116. The link-state table 116 includes link states and N:1 states in association with the link numbers. For the link state, "0" indicates "active" and "1" indicates "inactive". For the N:1 state, "0" indicates a state in which the backup path is not shared and "1" indicates that the backup path is shared. Unlike the related art, the link-state table 116 in the present embodiment includes the N:1 states in addition to the link states.

FIG. 5 illustrates the structure of the class-assignment table 117. The class-assignment table 117 includes PCP numbers in association with class numbers. The class-assignment table 117 also includes classes in association with the PCP numbers. The classes included are, for example, a high class, a middle class, and a low class. In the present embodiment, the class-assignment table 117 is provided, unlike the related art.

Figure 6A:
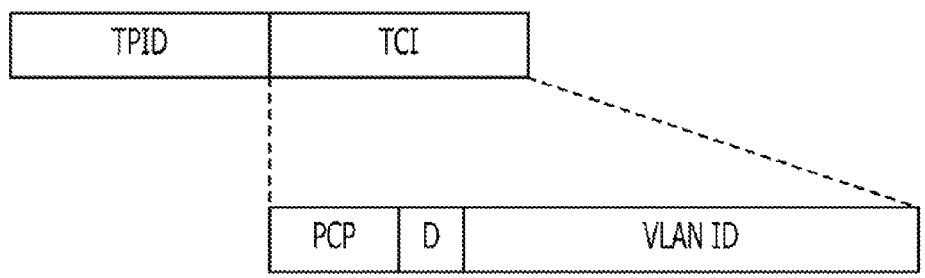
FIG. 6A illustrates the structure of a service VLAN tag.
Figure 6B:
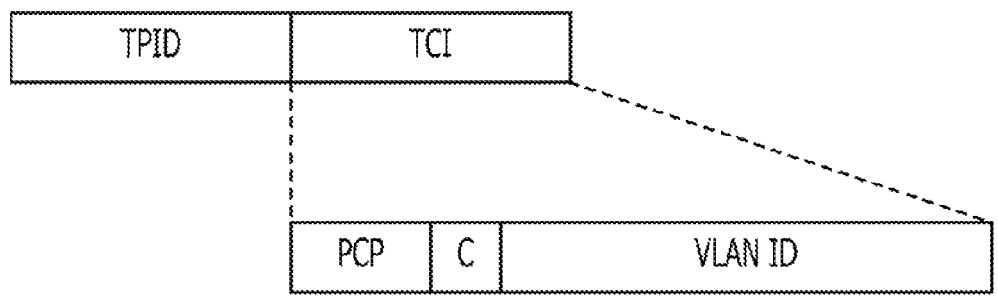
FIG. 6B illustrates the structure of a customer VLAN tag.

FIG. 6A illustrates the structure of a service VLAN tag and FIG. 6B illustrates the structure of a customer VLAN tag. As illustrated in FIG. 6A, the service VLAN tag includes a 16-bit TPID (tag protocol identifier) and 16-bit TCI (tag control information). The TCI includes a 3-bit PCP, a 1-bit DEI (drop eligible indicator), and a 12-bit VID (VLAN identifier). As illustrated in FIG. 6B, the customer VLAN tag includes a 16-bit TPID and 16-bit TCI. The TCI includes a 3-bit PCP, a 1-bit CFI (canonical format indicator), and a 12-bit VID.

Figure 7:
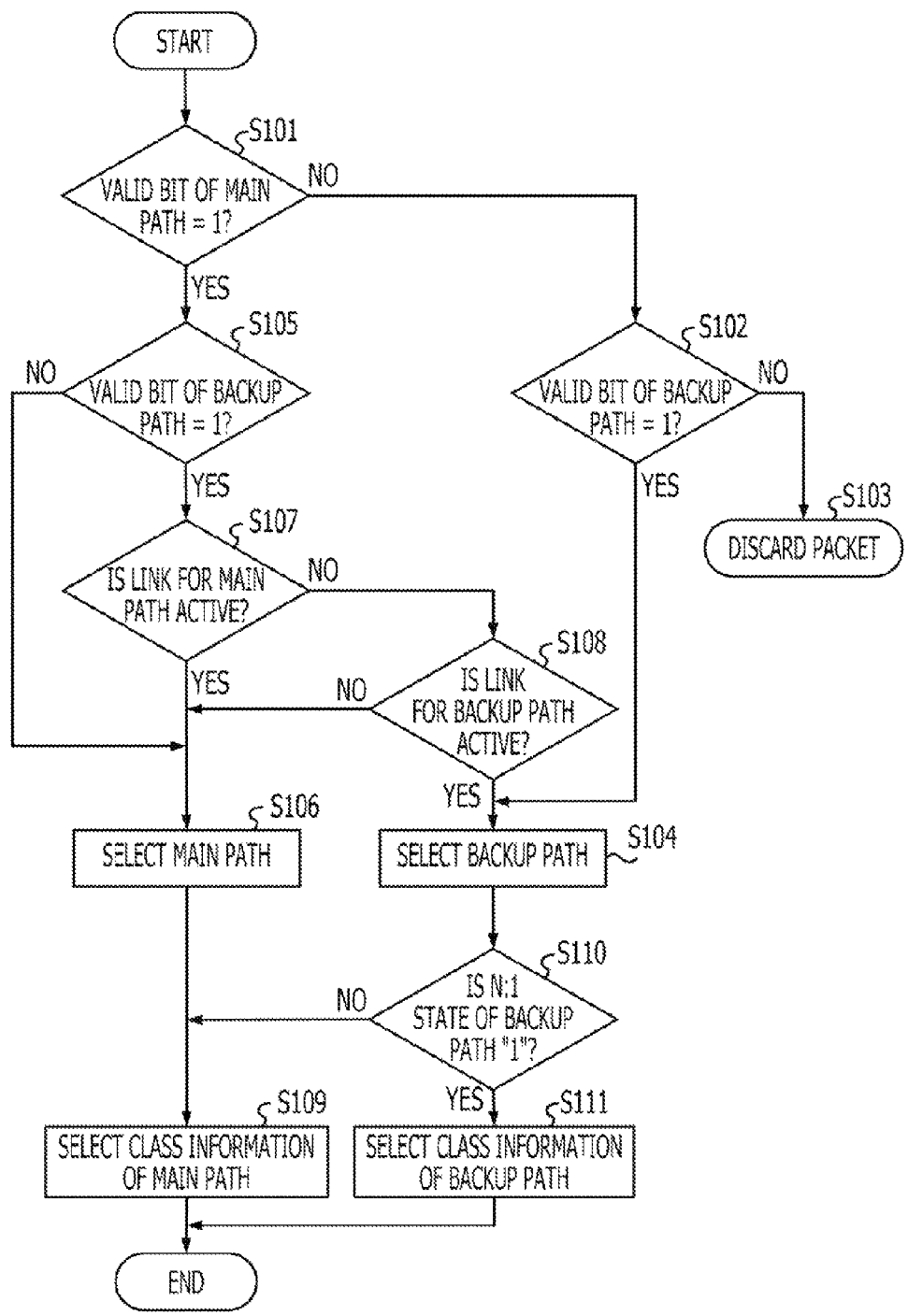
FIG. 7 illustrates a processing flow of a path-selection processing unit and a class-assignment controlling unit.

Next, a description will be given of a processing flow of the path-selection processing unit 112 and the class-assignment controlling unit 113. FIG. 7 illustrates a processing flow of the path-selection processing unit 112 and the class-assignment controlling unit 113. First, a description will be given of processing until the path-selection processing unit 112 selects one of the main path 150 and the backup path 170.

First, in operation S101, the path-selection processing unit 112 determines whether or not the valid bit of the main path 150 is "1" by referring to the path-selection table 115. When the valid bit of the main path 150 is not "1" (NO in operation S101), the process proceeds to operation S102 in which the path-selection processing unit 112 determines whether or not the valid bit of the backup path 170 is "1" by referring to the path-selection table 115. When the valid bit of the backup path 170 is not "1" (NO in operation S102), the path-selection processing unit 112 discards the packet in operation S103. When the valid bit of the backup path 170 is "1" (YES in operation S102), the path-selection processing unit 112 selects the backup path 170 in operation S104.

On the other hand, when the valid bit of the main path 150 is "1" (YES in operation S101), the process proceeds to operation S105 in which the path-selection processing unit 112 determines whether or not the valid bit of the backup path 170 is "1" by referring to the path-selection table 115. When the valid bit of the backup path 170 is not "1" (NO in operation S105), the path-selection processing unit 112 selects the main path 150 in operation S106.

When the valid bit of the backup path 170 is "1" (YES in operation S105), the process proceeds to operation S107 in which the path-selection processing unit 112 determines whether or not the link for the main path 150 is active. More specifically, the path-selection processing unit 112 refers to the link-state table 116 by using the link number in the path-selection table 115 as an address, to thereby determine whether or not the link for the main path 150 is active. When the link for the main path 150 is active (YES in operation S107), the path-selection processing unit 112 selects the main path 150 in operation S106. On the other hand, when the link for the main path 150 is not active (NO in operation S107), the process proceeds to operation S108 in which the path-selection processing unit 112 determines whether or not the link for the backup path 170 is active. More specifically, the path-selection processing unit 112 refers to the link-state table 116 by using the link number in the path-selection table 115 as an address, to thereby determine whether or not the link for the backup path 170 is active. When the link for the backup path 170 is active (YES in operation S108), the path-selection processing unit 112 selects the backup path 170 in operation S104. On the other hand, when the link for the backup path 170 is not active (NO in operation S108), the path-selection processing unit 112 selects the main path 150 in operation S106.

That is, through the processing in operations S101 to S108, when one of the valid bits of the main path 150 and the backup path 170 is valid, the path-selection processing unit 112 forcibly selects the path for which the valid bit is valid. When both of the valid bits of the main path 150 and the backup path 170 are valid, the path-selection processing unit 112 determines whether or not the link for the main path 150 is active. When the link for the main path 150 is active, the path-selection processing unit 112 selects the main path 150. When the link for the main path 150 is inactive, the path-selection processing unit 112 determines whether or not the link for the backup path 170 is active. When the link for the backup path 170 is active, the path-selection processing unit 112 selects the backup path 170, and when the link for the backup path 170 is inactive, the path-selection processing unit 112 selects the main path 150. When both of the valid bits of the main path 150 and the backup path 170 are invalid, the path-selection processing unit 112 discards the corresponding packet.

Next, a description will be given of class assignment processing after the path-selection processing unit 112 selects one of the main path 150 and the backup path 170. When the main path 150 is selected in operation S106, the class-assignment controlling unit 113 selects the class information of the main path 150 in operation S109. More specifically, the class-assignment controlling unit 113 refers to the class-assignment table 117 by using the class number in the path-selection table 115 and the PCP number of the input packet as an address, to thereby select the class information of the main path 150. That is, the class-assignment controlling unit 113 obtains the class information by reading the class-assignment table 117 on the basis of the class number obtained from the path-selection table 115, rather than directly obtaining the class number from the path-selection table 115. This is to facilitate assignment of different or common classes to the users (the flows).

On the other hand, when the backup path 170 is selected in operation S104, the process proceeds to operation S110 in which the class-assignment controlling unit 113 determines whether or not the N:1 state of the backup path 170 is "1". More specifically, the class-assignment controlling unit 113 refers to the link-state table 116 by using the link number in the path-selection table 115 as an address, to thereby determine whether or not the N:1 state is "1". When the N:1 state is "1" (YES in operation S110), the class-assignment controlling unit 113 determines that the backup path 170 is shared and selects the class information of the backup path 170 in operation S111. More specifically, the class-assignment controlling unit 113 refers to the class-assignment table 117 by using the class number in the path-selection table 115 and the PCP number of the input packet as an address, to thereby select the class information of the backup path 170. That is, the class-assignment controlling unit 113 determines whether or not the backup path 170 is shared by the main paths 150 and 160, and upon determining that the backup path 170 is shared, the class-assignment controlling unit 113 changes the class assigned to the packet to be transmitted to the backup path 170. On the other hand, when the N:1 state is not "1" (NO in operation S110), the class-assignment controlling unit 113 determines that the backup path 170 is not shared and selects the class information of the main path 150 in operation S109.

As described above, even when the backup path 170 is used, the class-assignment controlling unit 113 may use the class information of the main path 150, depending on the N:1 state of the backup path 170. For example, when the backup path 170 is not congested, the class-assignment controlling unit 113 uses the class information of the main path 150. The case in which the backup path 170 is not congested refers to, for example, a case in which the backup path 170 is not shared by another user or a case in which the backup path 170 is shared by another user but the another user uses the main path 150. That is, the class information of the backup path 170 is selected when the protection paths that shares the backup path 170 are in failed states at substantially the same time and the protection paths uses the backup path 170 at substantially the same time. In other words, the class-assignment controlling unit 113 selects the class information of the backup path 170 when the backup path 170 is congested. For discarding the packet owing to the congested state when the backup path 170 is shared, statistical information for packets to be discarded can be collected for each path identifier (VLAN ID). This arrangement makes it possible to collect the number of discarded packets for each flow.

Figure 8:
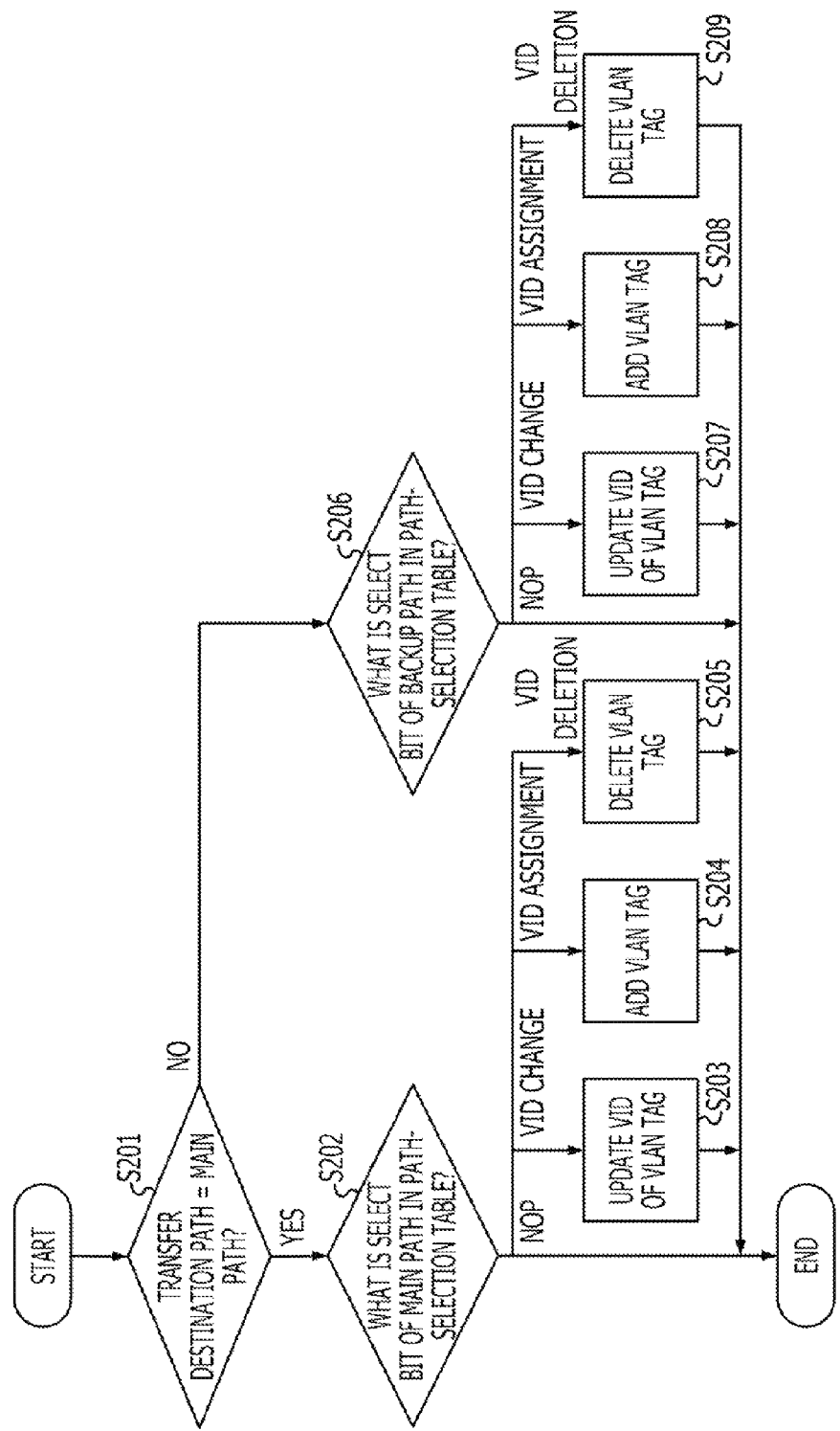
FIG. 8 illustrates a processing flow of a VLAN change processing unit.

A processing flow of the VLAN change processing unit 114 will be described next. FIG. 8 illustrates a processing flow of the VLAN change processing unit 114. More specifically, FIG. 8 illustrates VLAN change processing after the path-selection processing unit 112 performs the class assignment processing. First, in operation S201, the VLAN change processing unit 114 determines whether or not the transfer destination path of the packet is the main path 150. When the transfer destination path of the packet is the main path 150 (YES in operation S201), the VLAN change processing unit 114 checks the select bit of the main path 150 in the path-selection table 115 in operation S202. When the select bit of the main path 150 indicates "NOP", the VLAN change processing unit 114 ends the processing. When the select bit of the main path 150 indicates "VID change", the VLAN change processing unit 114 updates the VID of the VLAN tag in operation S203. When the select bit of the main path 150 indicates "VID assignment", the VLAN change processing unit 114 adds a VLAN tag in operation S204. When the select bit of the main path 150 indicates "VID deletion", the VLAN change processing unit 114 deletes the VLAN tag in operation S205.

On the other hand, when the transfer destination path of the packet is the backup path 170 (NO in operation S201), the VLAN change processing unit 114 checks the select bit of the backup path 170 in the path-selection table 115 in operation S206. When the select bit of the backup path 170 indicates "NOP", the VLAN change processing unit 114 ends the processing. When the select bit of the backup path 170 indicates "VID change", the VLAN change processing unit 114 updates the VID of the VLAN tag in operation S207. When the select bit of the backup path 170 indicates "VID assignment", the VLAN change processing unit 114 adds a VLAN tag in operation S208. When the select bit of the backup path 170 indicates "VID deletion", the VLAN change processing unit 114 deletes the VLAN tag in operation S209.

Figure 9:
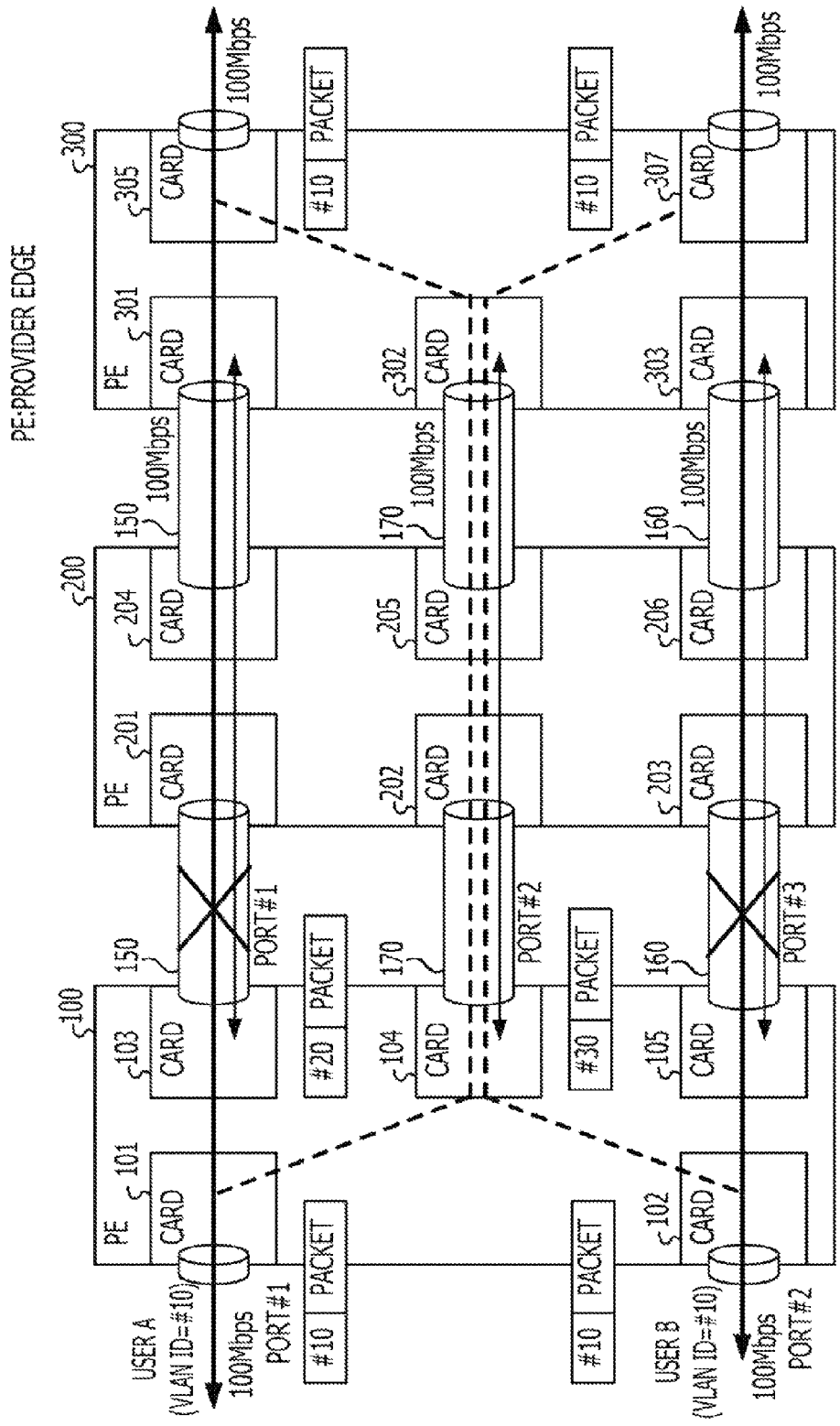
FIG. 9 illustrates one example of operations of the path-selection processing unit, the class-assignment controlling unit, and the VLAN change processing unit.

Next, a description will be given of an embodiment in which the packet class assignment and the VLAN ID change are performed. FIG. 9 illustrates one example of operations of the path-selection processing unit 112, the class-assignment controlling unit 113, and the VLAN change processing unit 114. Since the configurations of the PE routers 100, 200, and 300 are substantially similar to those illustrated in FIG. 1, descriptions thereof are not given hereinafter. As illustrated in FIG. 9, in this example, the users A and B share the backup path 170. In this example, it is also assumed that the VLAN ID of an input packet from the user A is "10" and the VLAN ID of an input packet from the user B is also "10". In this case, when the input packets are transferred in their original formats, there are cases in which the packets are mixed in the card 104 and the packets cannot be separated from the card 302 to the card 305 or 307. In order to overcome the problem, the card 101 and the card 102 rewrite the VLAN IDs "10" of the input packets to "20" and "30", respectively. The card 302 returns the IDs to their original VLAN IDs "10", after identifying the transfer destinations of the packets on the basis of the VLAN IDs "20" and "30". A description below will be given of operations of the class-assignment controlling unit 113 and the VLAN change processing unit 114 in each of the cards 101 and 302.

Figure 10:
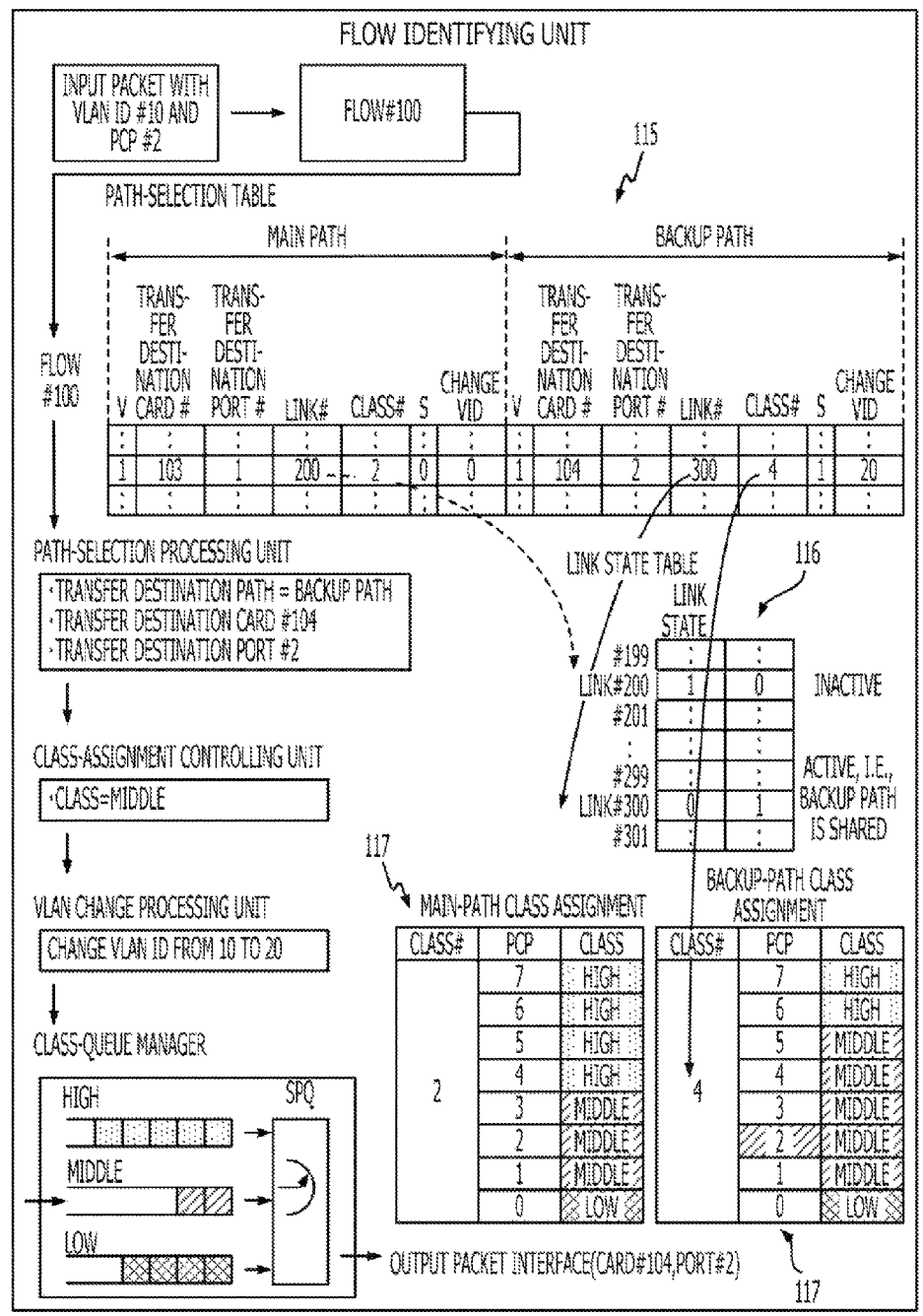
FIG. 10 illustrates a flow of processing of the path-selection processing unit, the class-assignment controlling unit, and the VLAN change processing unit.

FIG. 10 illustrates a flow of the processing of the path-selection processing unit 112, the class-assignment controlling unit 113, and the VLAN change processing unit 114. As illustrated in FIG. 10, first, the flow identifying unit 111 determines a flow number for an input packet. In the example of FIG. 10, when a packet with customer VLAN ID "10" is input, the flow identifying unit 111 determines that the flow number is "100". Next, the path-selection processing unit 112 refers to the path-selection table 115 by using the flow number "100" as an address, to thereby obtain a link number "200" for the main path 150 and a link number "300" for the backup path 170. By using the obtained link numbers as addresses, the path-selection processing unit 112 obtains the link state and the N:1 state in the link-state table 116. Next, the path-selection processing unit 112 selects the path. In this example, since the link states of link number "200" for the main path 150 is "1" (inactive) and the link states of the link number "300" for the backup path 170 is "0" (active), the path-selection processing unit 112 selects the backup path 170 (the transfer destination card number 104 and a transfer-destination port number 2).

Further, since the N:1 state of the link number "300" indicates that the backup path 170 is shared, the class-assignment controlling unit 113 refers to the path-selection table 115 to select a class number "4" for the backup path 170. The class-assignment controlling unit 113 also refers to the class-assignment table 117. In this case, since the PCP bit of the input packet is "2", the class-assignment controlling unit 113 selects class information indicating "middle".

Since the select (S) bit in the path-selection table 115 indicates "VID change", the VLAN change processing unit 114 changes the VLAN ID "10" of the input packet to "20". Thereafter, based on the class assigned by the class-assignment controlling unit 113, the input packet is buffered in the middle class queue for a corresponding output packet interface, the queue being included in the class-queue manager 120. Thereafter, the class-queue manager 120 transfers the packet to the output packet interface in accordance with the SPQ. For example, when packets are mixed in the high class queue, the packets with the high class are transferred with high priority and, when the high class queue is emptied, packets in the middle class queue are transferred. In this example, although the SPQ is employed, WRP (weighted round robin) may also be used.

Figure 11:
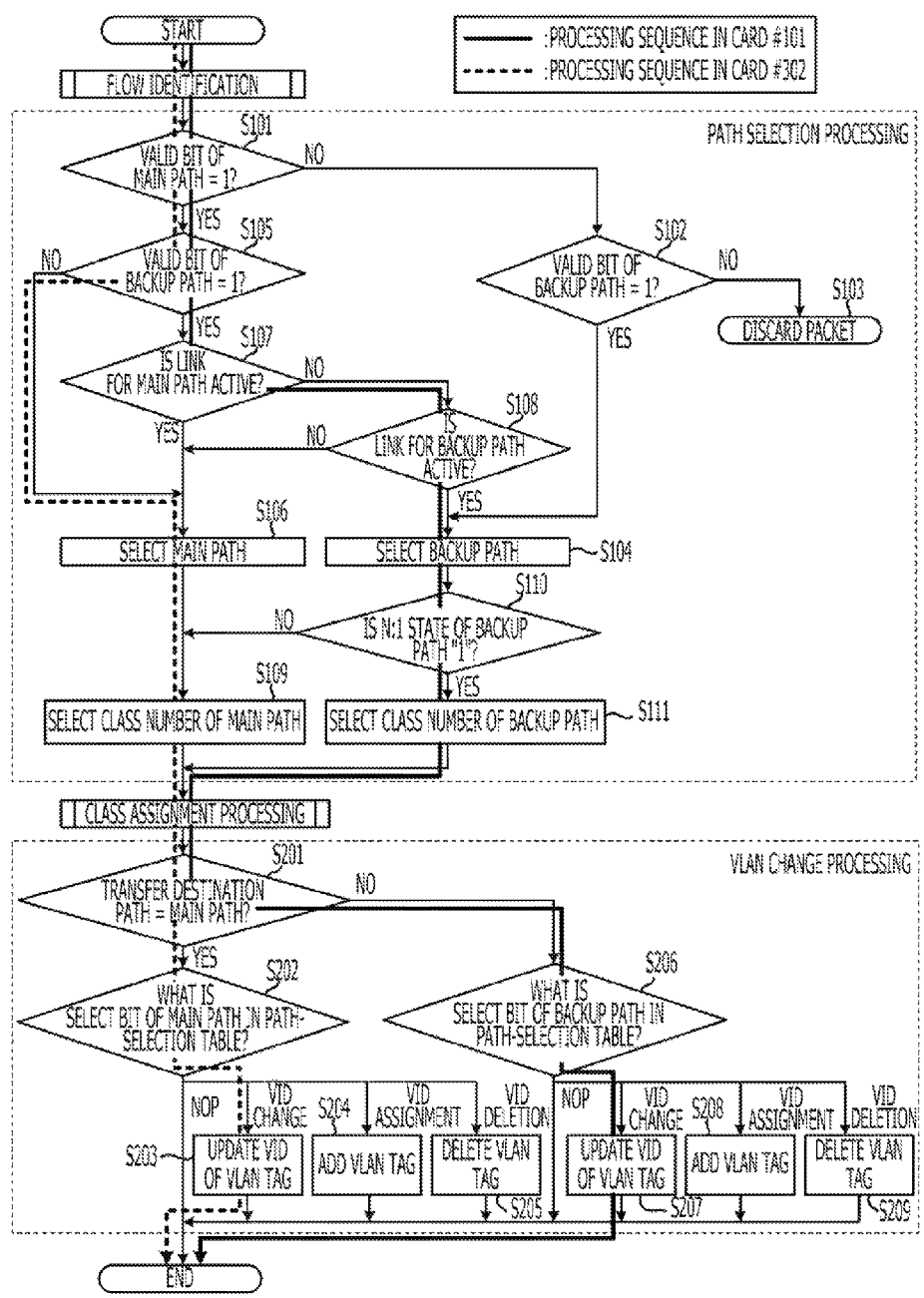
FIG. 11 illustrates a processing flow of the operations of the path-selection processing unit, the class-assignment controlling unit, and the VLAN change processing unit in the example of FIG. 10.

FIG. 11 illustrates a processing flow of the operations of the path-selection processing unit 112, the class-assignment controlling unit 113, and the VLAN change processing unit 114 in the example of FIG. 10. Since the operations in the processing flow in FIG. 11 are substantially the same as those in the processing flows in FIGS. 7 and 8, detailed descriptions thereof are not given hereinafter. In FIG. 11, the flow of processing denoted by solid lines represents a processing sequence in the card 101 and the flow of processing denoted by dotted lines represents a processing sequence in the card 302. In the card 101, first, in operation S101, the path-selection processing unit 112 determines whether or not the valid bit of the main path 150 is "1". Since the valid bit of the main path 150 is "1" as indicated in the path-selection table 115 in FIG. 10, the process proceeds to operation S105 in which the path-selection processing unit 112 determines whether or not the valid bit of the backup path 170 is "1". Since the valid bit of the backup path 170 is "1" as indicated in the path-selection table 115 in FIG. 10, the process proceeds to operation S107 in which the path-selection processing unit 112 determines whether or not the link for the main path 150 is active. Since the link for the main path 150 is inactive as indicated in the link-state table 116 in FIG. 10, the process proceeds to operation S108 in which the path-selection processing unit 112 determines whether or not the link for the backup path 170 is active. Since the link for the backup path 170 is active (YES in operation S108) as indicated in the link-state table 116 in FIG. 10, the path-selection processing unit 112 selects the backup path 170 in operation S104.

Subsequently, in operation S110, the class-assignment controlling unit 113 determines whether or not the N:1 state of the backup path 170 is "1". Since the N:1 state of the backup path 170 is "1" (YES in operation S110) as illustrated in the link-state table 116 in FIG. 10, the class-assignment controlling unit 113 refers to the class-assignment table 117 for the backup path 170. In operation S111, the class-assignment controlling unit 113 selects the class "middle" corresponding to the PCP bit "2".

Subsequently, in operation S201, the VLAN change processing unit 114 determines whether or not the transfer destination path of the packet is the main path 150. In this case, since the transfer destination path of the packet is the backup path 170 (NO in operation S201), the VLAN change processing unit 114 checks the select bit of the backup path 170 in the path-selection table 115 in operation S206. Since the select bit of the backup path 170 is "1" indicating "VID change" as indicated in the path-selection table 115 in FIG. 10, the VLAN change processing unit 114 updates the VID of the VLAN tag from "10" to "20" in operation S207.

On the other hand, in the card 302, in operation S101, the path-selection processing unit 112 first determines whether or not the valid bit of the main path 150 is "1". In this case, since the valid bit of the main path 150 is "1" (YES in operation S101), the process proceeds to operation S105 in which the path-selection processing unit 112 determines whether or not the valid bit of a backup path is "1". In this case, since there is no backup-path configuration, i.e., the valid bit is "0" (NO in operation S105), the path-selection processing unit 112 selects the main path 150 in operation S106.

Subsequently, in the card 302, in operation S201, the VLAN change processing unit 114 determines whether or not the transfer destination path of the packet is the main path 150. In this case, since the transfer destination path of the packet is the main path 150 (YES in operation S201), the VLAN change processing unit 114 checks the select bit of the main path 150 in the path-selection table 115 in operation S202. In this case, since the select bit of the main path 150 in the path-selection table 115 is "1" indicating "VID change", the VLAN change processing unit 114 updates the VID of the VLAN tag from "20" to "10" in operation S203.

Figure 12:
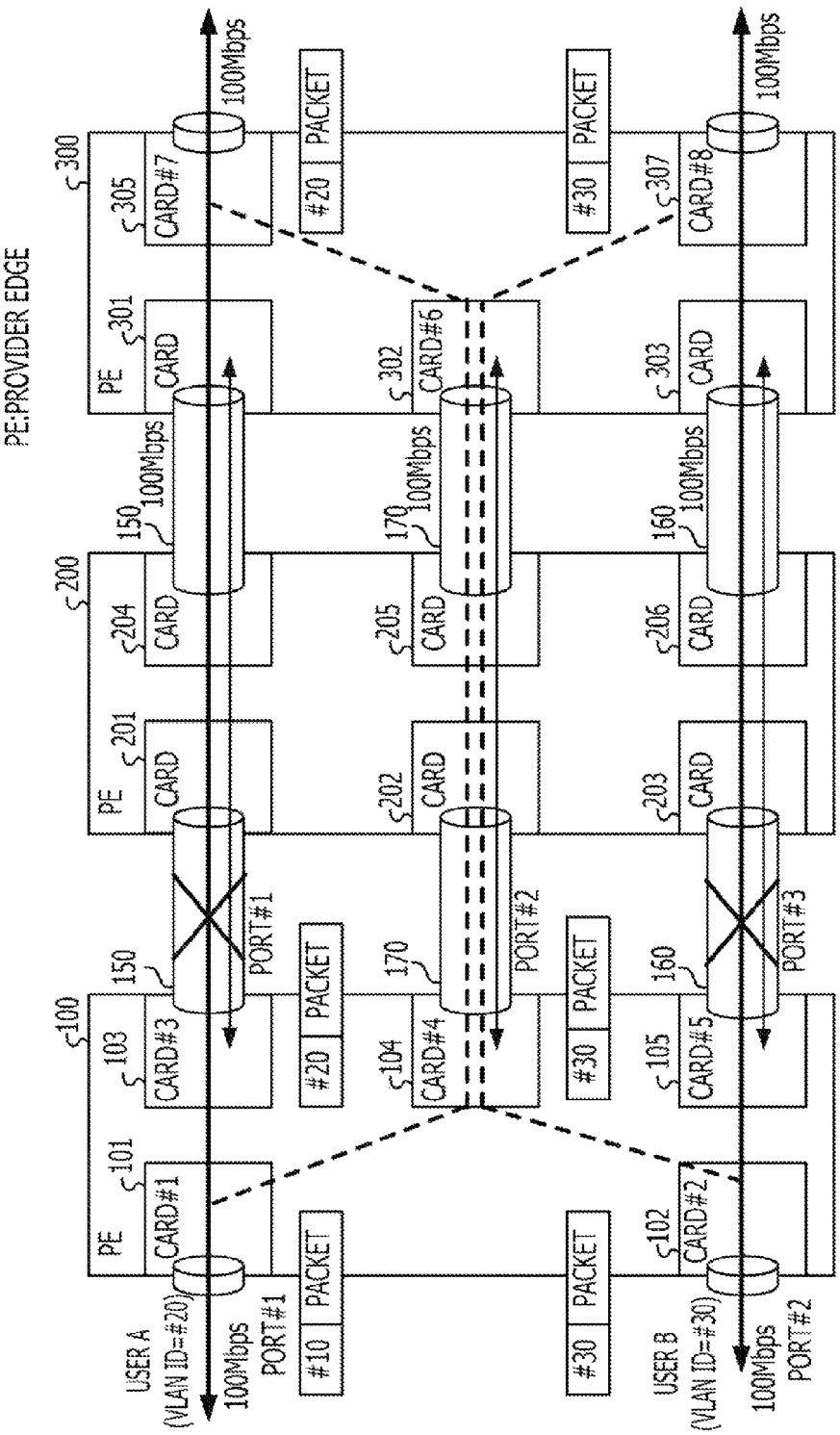
FIG. 12 illustrates operations of the path-selection processing unit, the class-assignment controlling unit, and the VLAN change processing unit.

Next, a description will be given of an embodiment in which the packet class assignment is performed and the VLAN ID change is not performed. FIG. 12 illustrates operations of the path-selection processing unit 112, the class-assignment controlling unit 113, and the VLAN change processing unit 114. Since the configurations of the PE routers 100, 200, and 300 are substantially similar to those illustrated in FIG. 1, descriptions thereof are not given hereinafter. As illustrated in FIG. 12, in this example, the users A and B share the backup path 170. In this example, it is also assumed that the VLAN ID of an input packet from the user A is "20" and the VLAN ID of an input packet from the user B is "30". Even in a case in which the multiple users (flows) share the backup path 170, as in this example, when the flows in the backup path 170 can be identified (the VLAN ID of the user A is "20" and the VLAN ID of the user B is "30"), the VLAN IDs of the input packets are not changed. A description below will be given of operations of the class-assignment controlling unit 113 and the VLAN change processing unit 114 in each of the cards 101 and 302.

Figure 13:
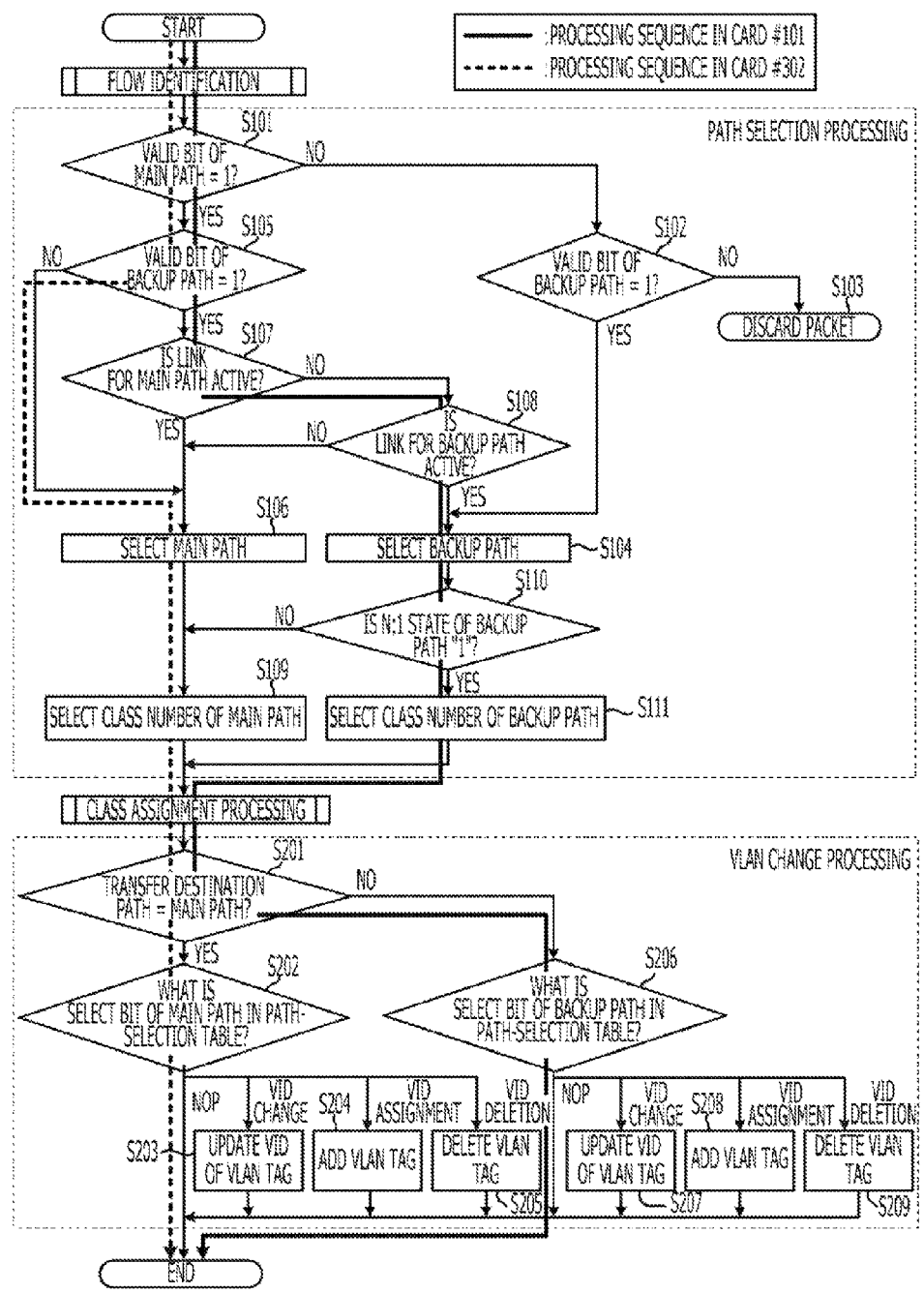
FIG. 13 illustrates a processing flow of the operations of the path-selection processing unit, the class-assignment controlling unit, and the VLAN change processing unit in the example of FIG. 12.

FIG. 13 illustrates a processing flow of the operations of the path-selection processing unit 112, the class-assignment controlling unit 113, and the VLAN change processing unit 114 in the example of FIG. 12. In FIG. 13, the flow of processing denoted by solid lines represents a processing sequence in the card 101 and the flow of processing denoted by dotted lines represents a processing sequence in the card 302. Since the operations in the processing flow in FIG. 13 are substantially the same as those in the processing flows in FIGS. 7 and 8, detailed descriptions thereof are not given hereinafter. Since the processing of the path-selection processing unit 112 and the class-assignment controlling unit 113 in each of the cards 101 and 302 is substantially the same as that illustrated in FIG. 11, a description thereof is not given hereinafter.

In the card 101, in operation S201, the VLAN change processing unit 114 determines whether or not the transfer destination path of the packet is the main path 150. In this case, since the transfer destination path of the packet is the backup path 170 (NO in operation S201), the VLAN change processing unit 114 checks the select bit of the backup path 170 in the path-selection table 115 in operation S206. In this case, since the select bit of the backup path 170 is "0" indicating "NOP", the VLAN change processing unit 114 ends the processing.

On the other hand, in the card 302, in operation S201, the VLAN change processing unit 114 determines whether or not the transfer destination path of the packet is the main path 150. In this case, since the transfer destination path of the packet is the main path 150 (YES in operation S201), the VLAN change processing unit 114 checks the select bit of the main path 150 in the path-selection table 115 in operation S202. In this case, since the select bit of the main path 150 in the path-selection table 115 is "0" indicating "NOP", the VLAN change processing unit 114 ends the processing.

Figure 14:
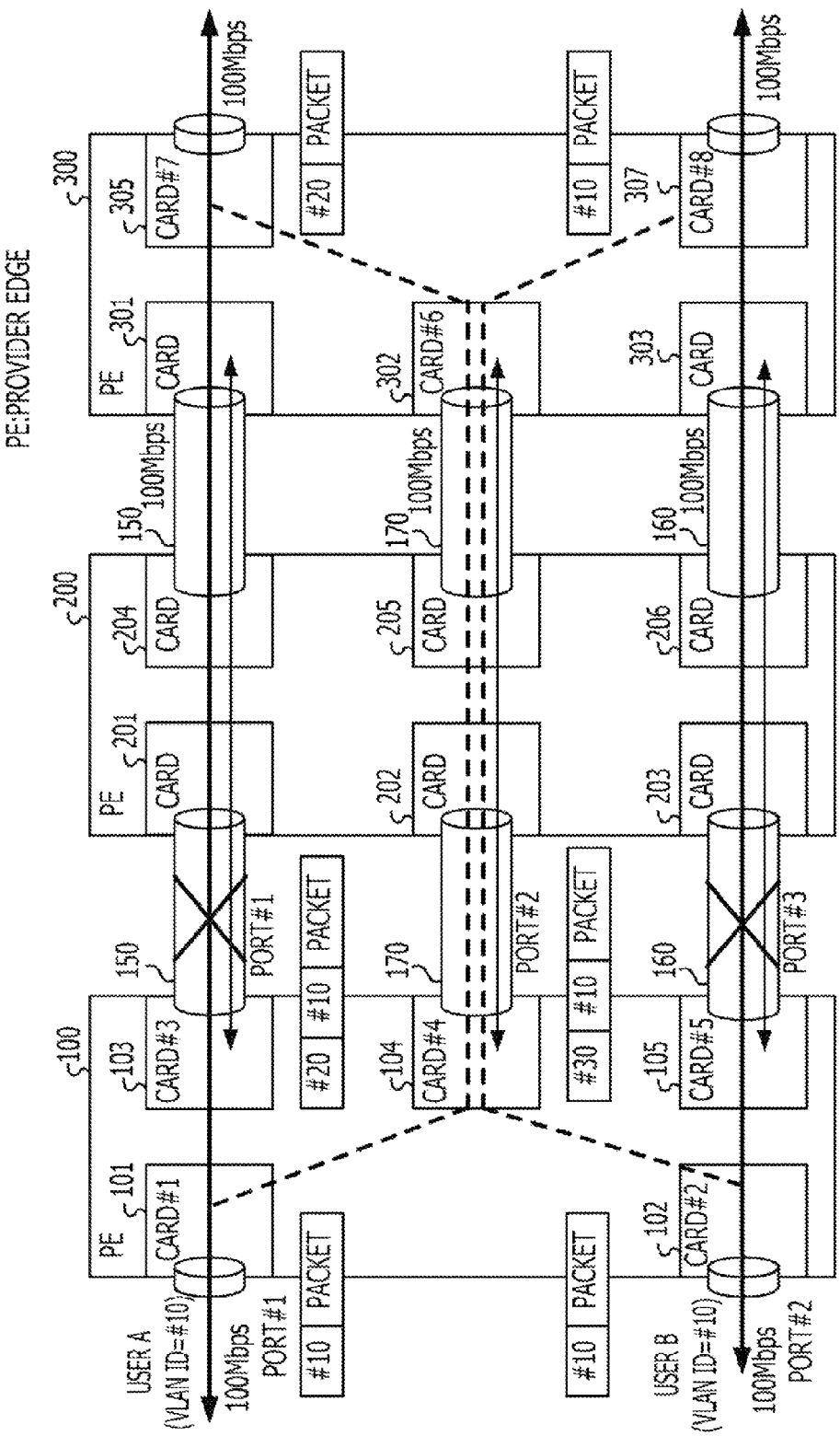
FIG. 14 illustrates operations of the path-selection processing unit, the class-assignment controlling unit, and the VLAN change processing unit.

Next, a description will be given of an embodiment in which the packet class assignment is performed and also the VLAN ID addition and deletion are performed. FIG. 14 illustrates operations of the path-selection processing unit 112, the class-assignment controlling unit 113, and the VLAN change processing unit 114. Since the configurations of the PE routers 100, 200, and 300 are substantially similar to those illustrated in FIG. 1, descriptions thereof are not given hereinafter. As illustrated in FIG. 14, in this example, the users A and B share the backup path 170. In this example, it is also assumed that the VLAN ID of an input packet from the user A is "10" and the VLAN ID of an input packet from the user B is also "10". In this case, when the input packets are transferred in their original formats, there are cases in which the packets are mixed in the card 104 and the packets cannot be separated from the card 302 to the card 305 or 307. In order to overcome the problem, the card 101 and the card 102 add "20" and "30" to portions immediately before the VLAN IDs "10" of the input packets, respectively, to thereby make the tags duplicated. After determining the transfer destinations on the basis of the VLAN IDs "20" and "30", the card 302 deletes the VLAN IDs "20" and "30. A description below will be given of operations of the class-assignment controlling unit 113 and the VLAN change processing unit 114 in each of the cards 101 and 302.

Figure 15:
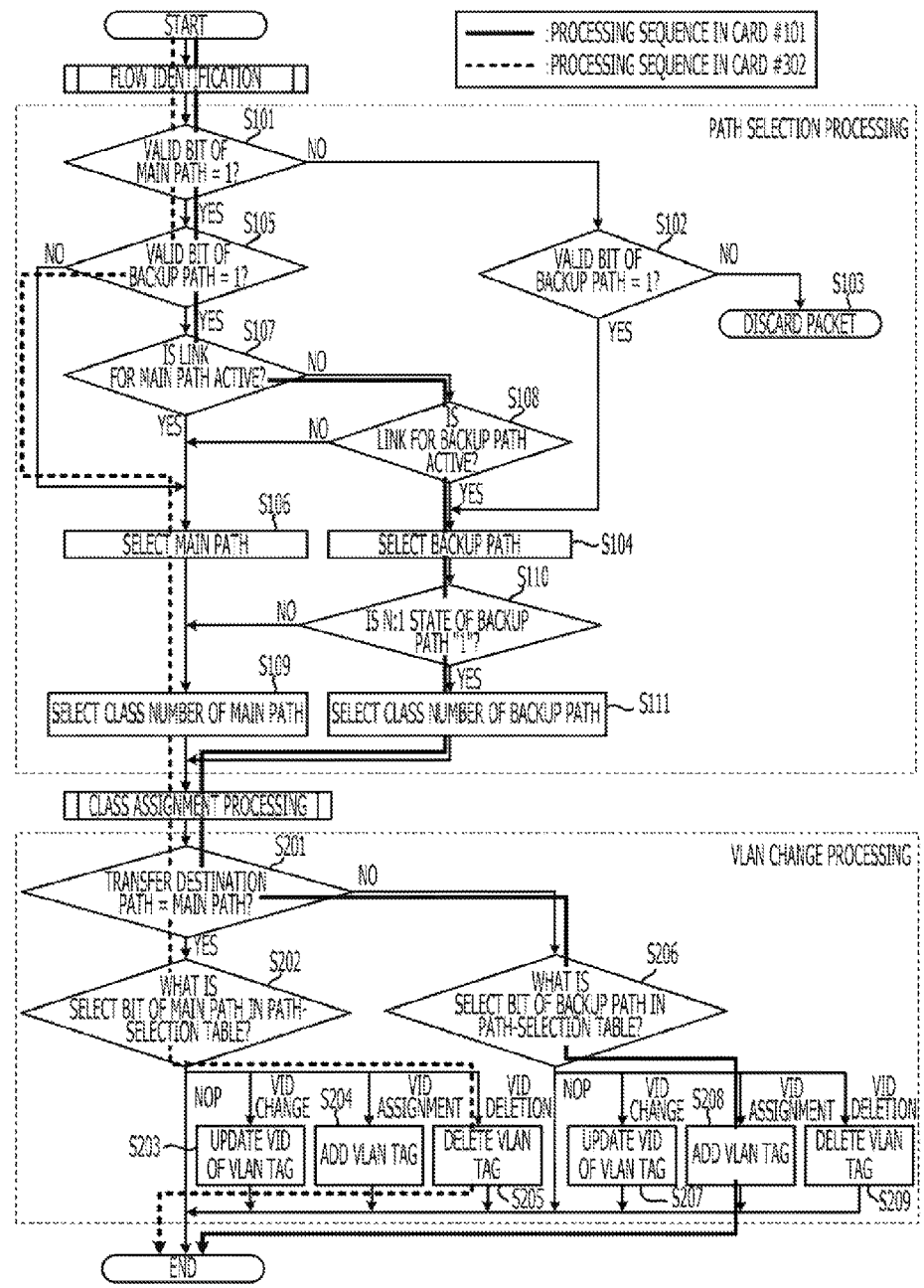
FIG. 15 illustrates a processing flow of the operations of the path-selection processing unit, the class-assignment controlling unit, and the VLAN change processing unit in the example of FIG. 14.

FIG. 15 illustrates a processing flow of the operations of the path-selection processing unit 112, the class-assignment controlling unit 113, and the VLAN change processing unit 114 in the example of FIG. 14. In FIG. 15, the flow of processing denoted by solid lines represents a processing sequence in the card 101 and the flow of processing denoted by dotted lines represents a processing sequence in the card 302. Since the operations in the processing flow in FIG. 15 are substantially the same as those in the processing flows in FIGS. 7 and 8, detailed descriptions thereof are not given hereinafter. Since the processing of the path-selection processing unit 112 and the class-assignment controlling unit 113 in each of the cards 101 and 302 is substantially the same as that illustrated in FIG. 11, a description thereof is not given hereinafter.

In the card 101, in operation S201, the VLAN change processing unit 114 determines whether or not the transfer destination path of the packet is the main path 150. In this case, since the transfer destination path of the packet is the backup path 170 (NO in operation S201), the VALN change processor 114 checks the select bit of the backup path 170 in the path-selection table 115 in operation S206. In this case, since the select bit of the backup path 170 is "2" indicating "VID assignment", the process proceeds to operation S208 in which the VLAN change processing unit 114 adds the VID "20" of the VLAN tag to the VID "10" of the VLAN tag.

On the other hand, in the card 302, in operation S201, the VLAN change processing unit 114 determines whether or not the transfer destination path of the packet is the main path 150. In this case, since the transfer destination path of the packet is the main path 150 (YES in operation S201), the VLAN change processing unit 114 checks the select bit of the main path 150 in the path-selection table 115 in operation S202. In this case, since the select bit of the main path 150 in the path-selection table 115 is "3" indicating "VID deletion", the VLAN change processing unit 114 deletes the VID "20" of the VLAN tag in operation S205.

According to the communication device and the communication method of the present embodiment, different classes can be assigned to the main path 150 and the backup path 170. That is, according to the communication device and the communication method of the present embodiment, since a different class can be assigned to the backup path 170, services having different priorities can be provided for the flows that share the backup path 170. According to the communication device and the communication method of the present embodiment, for example, when the user A and the user B are provided with a high-priority service and a medium-priority service, respectively, through the backup line, the services can be transmitted according to the different priorities. According to the communication device and the communication method of the present embodiment, different classes can be selected for the main path 150 and the backup path 170. In addition, according to the communication device and the communication method of the present embodiment, a backup-path-dedicated class can be assigned only when multiple users (flows) share the backup path 170.

According to the communication device and the communication method of the present embodiment, when VLAN flows of different users exist in the backup path 170, it is possible to use new VLAN IDs for identifying the flows. That is, according to the communication device and the communication method of the present embodiment, the path identifier (VLAN ID) of an input packet is changed or a path identifier is added to an input packet to thereby make it possible to identify flows of packets having the same path identifier. Since the change of the path identifier is performed only for the section of the backup path, it is possible to identify the flows of packets having the same path identifier without the user being aware of re-writing of the VLAN IDs in the network.

In addition, according to the communication device and the communication method of the present embodiment, since the classes assigned to packets transmitted to the main paths 150 and 160 and the backup path 170 are stored in the class-assignment table 117, the class assignment processing can be performed with a simple configuration. Additionally, according to the communication device and the communication method of the present embodiment, since path identifiers for the change and addition during transmission of packets to the backup path 170 are stored in the path-selection table 115, the change or addition of the path identifiers can be performed with a simple configuration. Since the communication device and the communication method of the present embodiment allow a path other than the main paths 150 and 160 to be connected to only the backup path to provide a best-effort service, the backup path 170 can be efficiently used.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a illustrating of the superiority and inferiority of the invention. Although the embodiments have been described in detail, it should be understood that the various changes, substitutions, and alterations could be made hereto without departing from the spirit and scope of the invention.

What is claimed is:

1. A communication device comprising:
   a memory; and
   a processor coupled to the memory and configured to execute a process, the process including:
   determining whether a failure occurs in a first communication channel to transmit a packet to another communication device;
   selecting, upon determining that the failure occurs in the first communication channel, a second communication channel for transmitting the packet;
   determining, upon selecting the second communication channel, whether the second communication channel is shared by the first communication channel and a third communication channel;
   changing, upon determining that the second communication channel is shared, a first priority assigned to the packet to be transmitted through the shared second communication channel instead of the first communication channel where the failure occurs;
   controlling the transmission of the packet in accordance with the changed priority;
   determining, upon determining that the second communication is shared, whether an identifier for the first communication channel and an identifier for the third communication channel match each other; and
   changing, upon determining that the first-communication-channel identifier and the third-communication-channel identifier match each other, the first-communication-channel identifier added to the packet transmitted from the first communication channel to the second communication channel to a second-communication-channel identifier.

2. The communication device according to claim 1, further comprising:
   a priority memory that stores a priority for the first communication channel and a priority for the second communication channel,
   wherein the process further includes:
   reading, upon determining that the second communication channel is shared, the priority for the second communication channel from the priority memory and to change the priority assigned to the packet to be transmitted based on the read priority for the second communication channel.

3. The communication device according to claim 1, further comprising:
   an identifier memory that stores an identifier for the second communication channel,
   wherein the process further includes:
   reading, upon determining that the first-communication-channel identifier and the third-communication-channel identifier match each other, the second-communication-channel identifier from the identifier memory and to replace the read second-communication-channel identifier with the first-communication-channel identifier added to the packet or to add the read second-communication-channel identifier to the first-communication-channel identifier added to the packet.

4. The communication device according to claim 1, wherein the process further includes:
   performing best-effort-transmission control on the packet to be transmitted from a communication channel other than the first communication channel and the third regular communication channel through the second communication channel.

5. The communication device according to claim 1,
   wherein the first priority is different from a second priority assigned to a packet to be transmitted through the shared second communication channel instead of the third communication channel where a failure occurs.

6. A communication method comprising:
   determining whether a failure occurs in a first communication channel to transmit a packet to another communication device;
   selecting, upon determining that the failure occurs in the first communication channel, a second communication channel for transmitting the packet;
   determining, upon determining that the second communication channel is selected, whether the second communication channel is shared by the first communication channel and a third communication channel;
   changing, upon determining that the second communication channel is shared, a first priority assigned to the packet to be transmitted through the shared second communication channel instead of the first communication channel where the failure occurs;
   controlling the transmission of the packet in accordance with the changed priority;
   determining, upon determining that the second communication is shared, whether an identifier for the first communication channel and an identifier for the third communication channel match each other; and
   changing, upon determining that the first-communication-channel identifier and the third-communication-channel identifier match each other, the first-communication-channel identifier added to the packet transmitted from the first communication channel to the second communication channel to a second-communication-channel identifier.

7. The communication method according to claim 6, further comprising:
   changing the priority assigned to the packet based on a priority for the second communication channel, upon determining that the second communication channel is shared.

8. The communication method according to claim 6, further comprising:
   replacing the second-communication-channel identifier with the first-communication-channel identifier added to the packet or adding the second-communication-channel identifier to the first-communication-channel identifier added to the packet, upon determining that the first-communication-channel identifier and the third-communication-channel identifier match each other.

9. The communication method according to claim 6, wherein best-effort-transmission control is performed on the packet to be transmitted from a communication channel other than the first communication channel and the third communication channel to the second communication channel.

10. The communication method according to claim 6, wherein the first priority is different from a second priority assigned to a packet to be transmitted through the shared second communication channel instead of the third communication channel where a failure occurs.

* * * * *